United States Patent
Dayan et al.

(10) Patent No.: US 7,613,872 B2
(45) Date of Patent: Nov. 3, 2009

(54) PROVIDING CORE ROOT OF TRUST MEASUREMENT (CRTM) FOR SYSTEMS USING A BACKUP COPY OF BASIC INPUT/OUTPUT SYSTEM (BIOS)

(75) Inventors: Richard A. Dayan, Wake Forest, NC (US); Scott N. Dunham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 11/564,096

(22) Filed: Nov. 28, 2006

(65) Prior Publication Data

US 2008/0126782 A1     May 29, 2008

(51) Int. Cl.
*G06F 12/00* (2006.01)
(52) U.S. Cl. ...................................... 711/103
(58) Field of Classification Search ............... None
See application file for complete search history.

(56) References Cited

U.S. PATENT DOCUMENTS

| | | |
|---|---|---|
| 6,571,347 B1 | 5/2003 | Tseng |
| 2003/0208338 A1 | 11/2003 | Challener et al. |
| 2005/0021968 A1 | 1/2005 | Zimmer et al. |
| 2005/0108564 A1 | 5/2005 | Freeman et al. |
| 2005/0144443 A1 | 6/2005 | Cromer et al. |
| 2005/0246525 A1 | 11/2005 | Bade et al. |
| 2006/0010326 A1 | 1/2006 | Bade et al. |
| 2006/0155988 A1 | 7/2006 | Hunter et al. |

FOREIGN PATENT DOCUMENTS

WO    EP2007062394    11/2007

*Primary Examiner*—Hiep T Nguyen
(74) *Attorney, Agent, or Firm*—Cynthia Seal; Hoffman Warnick LLC

(57) ABSTRACT

A flash memory is provided that includes a primary flash bank and a secondary flash bank. The primary flash bank includes CRTM logic and BIOS logic and the secondary flash bank comprises a backup copy of the CRTM logic and the BIOS logic. A switching mechanism is configured to selectively activate the primary flash bank or the secondary flash bank.

20 Claims, 3 Drawing Sheets

PROVIDING CORE ROOT OF TRUST MEASUREMENT (CRTM) FOR SYSTEMS USING A BACKUP COPY OF BASIC INPUT/OUTPUT SYSTEM (BIOS)

BACKGROUND

This disclosure relates generally to booting a computer system, and more specifically to providing CRTM for computer systems using a backup copy of BIOS.

Computer manufacturers have recently introduced computer systems that utilize a backup copy of BIOS firmware. In these systems, both the BIOS and backup copy of the BIOS run off a read-only memory (ROM) device such as a flash memory. One of the rationales for utilizing a backup copy of BIOS is to avoid using a boot block, which is a portion of logic in the ROM that runs first and is not updateable. The boot block logic will verify that the rest of the BIOS is intact via operations such as a checksum and hash before jumping to the rest of the BIOS. If the boot block logic determines that the main BIOS is fine, it then passes control to that main portion of BIOS for initiating the rest of the operations associated with the BIOS. As the boot block logic passes control to the main BIOS it also locks itself so that it cannot be unlocked until a reset occurs. Alternatively, if the boot block logic detects that the main BIOS is corrupt, then it will notify the user to boot through a boot media or bootable device. The boot block logic can then read a new BIOS image off the boot media or bootable device and update the BIOS.

An issue that arises with systems that utilize a backup copy of BIOS firmware is how to implement CRTM, which is logic developed by the Trusted Computing Group (TCG), successor to the Trusted Computing Platform Alliance (TCPA), which is an industry standard work group that has a common goal of trying to solve security problems that exist in the computing industry. CRTM is one solution that many computer manufacturers have implemented within the boot block logic. Typically, in operation, the CRTM logic gets control of the system at power on, does some initialization and then proceeds to make a series of measurements using a complex algorithm. The CRTM logic stores the measurements in a Trusted Platform Module (TPM) and then the boot block checks the BIOS. Eventually, the boot block logic passes control to the BIOS, which performs a power-on self test (POST), which is built-in diagnostic logic that checks hardware to ensure that everything is present and functioning properly. After the POST, the BIOS progresses through its booting sequence and passes control to the operating system (OS). The OS then verifies the trustworthiness of the system by comparing the measurements taken by the CRTM logic with previous measurements stored in the TPM. If the measurements match, the OS has assurance to trust the system. Alternatively, if the measurements do not match, the OS is alert to the possibility of a breach and has the option to take measures to reestablish trust.

SUMMARY

As mentioned above, computer systems that utilize a backup copy of the BIOS firmware will not have a boot block. Because the boot block typically includes the CRTM logic, computer manufacturers need to develop an approach for providing CRTM in computer systems that utilize a backup copy of the BIOS in place of the boot block.

In one embodiment, there is a computer system that comprises a flash memory. The flash memory includes a primary flash bank and a secondary flash bank. The primary flash bank comprises CRTM logic and BIOS logic and the secondary flash bank comprises a backup copy of the CRTM logic and the BIOS logic. A switching mechanism is configured to selectively activate the primary flash bank or the secondary flash bank.

In another embodiment, there is a method for providing CRTM within a computer system having a backup copy of BIOS logic. In this embodiment, the method comprises receiving an indication that the computer system is being powered on. The method also comprises selectively activating either a primary flash bank having CRTM logic and BIOS logic stored therein or a secondary flash bank having a backup copy of the CRTM logic and BIOS logic stored therein. In addition, the method comprises passing control of the computer system to the CRTM logic and then the BIOS logic of the selectively activated flash bank. The method further comprises activating the non-selected flash bank in response to the BIOS logic within the selected flash bank failing to execute to completion. In addition, the method comprises passing control of the computer system to the CRTM logic and then the BIOS logic in the newly activated flash bank.

In a third embodiment, there is a computer-readable medium storing computer instructions for providing CRTM within a computer system having a backup copy of BIOS logic. In this embodiment, the computer instructions comprise receiving an indication that the computer system is being powered on; selectively activating either a primary flash bank having CRTM logic and BIOS logic stored therein or a secondary flash bank having a backup copy of the CRTM logic and BIOS logic stored therein; passing control of the computer system to the CRTM logic and then the BIOS logic of the selectively activated flash bank; activating the non-selected flash bank in response to the BIOS logic within the selected flash bank failing to execute to completion; and passing control of the computer system to the CRTM logic and then the BIOS logic in the newly activated flash bank.

DETAILED DESCRIPTION

Figure 1:
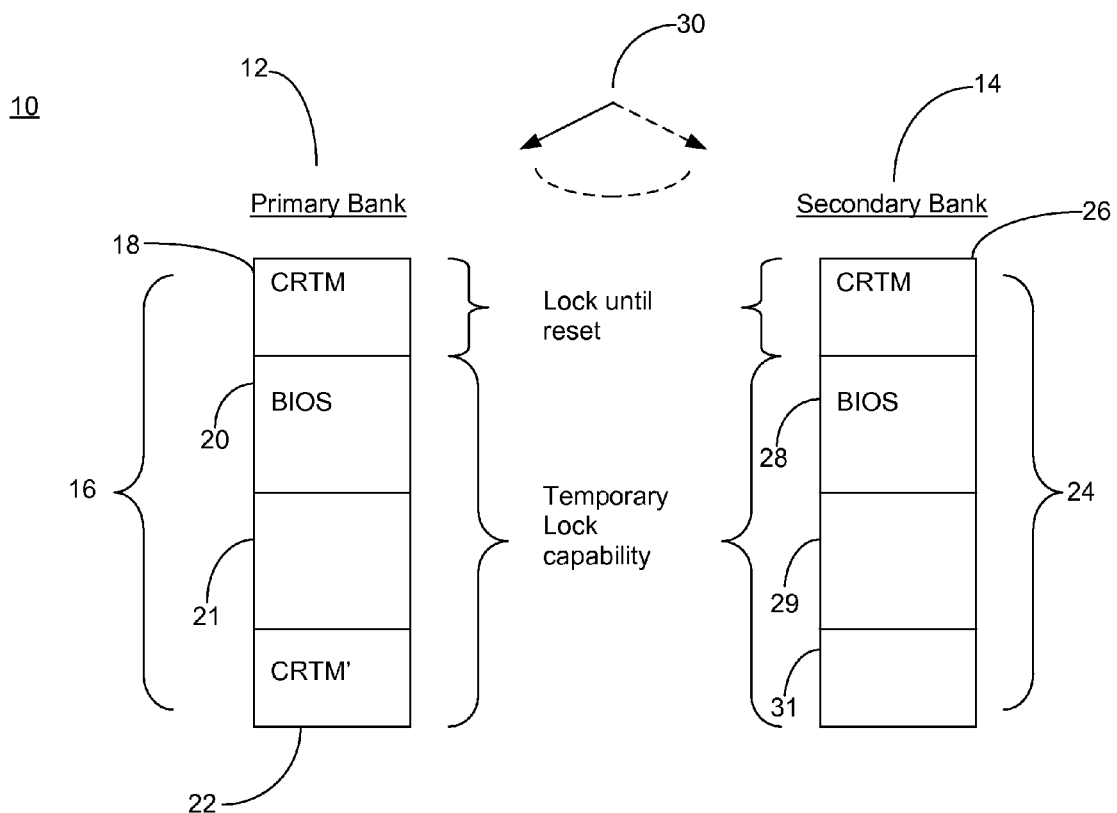
FIG. 1 shows a high-level diagram of a flash memory having a primary flash bank and a secondary flash bank according to one embodiment of this disclosure.

FIG. 1 shows a high-level diagram of a ROM device such as a flash memory 10 that is suitable for computer systems that employ a backup copy of BIOS. As shown in FIG. 1, the flash memory 10 comprises a primary flash bank 12 and a secondary flash bank 14. The primary flash bank 12 is segmented into multiple blocks 16 that may be read and programmed. For purposes of illustration, FIG. 1 shows only four blocks, however, those skilled in the art will recognize that there may be more blocks 16 within the primary flash bank 12. In FIG. 1, the primary flash bank 12 includes a block for the CRTM logic 18 and a block for the BIOS logic 20. The primary flash bank 12 in FIG. 1 also shows an empty block 21 and a CRTM staging block 22 configured to stage a CRTM update with replacement CRTM logic (CRTM'). Below are more details on staging a CRTM update with CRTM' logic.

As labeled in FIG. 1, the block for the CRTM logic 18 has lock until reset capability, which means that the logic will lock itself as well as the backup copy of the CRTM logic before passing control to the BIOS logic 20 and remain locked until a reset occurs. The lock until reset capability enables the CRTM logic 18 to be immutable (i.e., not corruptible). The other blocks (e.g., the block containing the BIOS logic 20, the empty block 21 and the block for staging a CRTM update with the CRTM' logic 22) of the primary flash bank 12 will have temporary lock capability, which means that these blocks are temporary locked, but can be unlocked to perform certain operations such as flashing the BIOS logic 20 or staging a CRTM update by writing the staging block with the CRTM' logic 22.

Referring back to FIG. 1, the secondary flash bank 14 is segmented into multiple blocks 24 that may be read and programmed. For purposes of illustration, FIG. 1 shows only four blocks 24, however, those skilled in the art will recognize that there may be more blocks within the secondary flash bank 14. In FIG. 1, the secondary flash bank 14 includes a block for a backup copy of the CRTM logic 26 and a block for the backup copy of the BIOS logic 28. The secondary flash bank 14 in FIG. 1 also shows two empty blocks 29 and 31. Those skilled in the art will recognize that it is also possible to have a CRTM staging block within the secondary flash bank 14 that is configured to stage a CRTM update with CRTM' logic. This CRTM staging block could be in addition to or in place of the one in the primary flash bank 12.

As labeled in FIG. 1, the block for the backup copy of the CRTM logic 26 has lock until reset capability, which means that the logic will lock itself as well as the primary CRTM logic before passing control to the backup copy of the BIOS logic 28 and remain locked until a reset occurs. The lock until reset capability enables the backup copy of the CRTM logic 26 to be immutable (i.e., not corruptible). The other blocks of the secondary flash bank 14 will have temporary lock capability, which means that these blocks are temporary locked, but can be unlocked to perform certain operations such as flashing the backup copy of the BIOS logic 28.

FIG. 1 shows that the primary flash bank 12 and the secondary flash bank 14 are substantially parallel to each other, however, this configuration is not meant to be limiting. Those skilled in the art will recognize that other configurations of the flash memory 10 are possible. For example, the secondary flash bank 14 may be serially juxtaposed with respect to the primary flash bank 12. Also, it is possible to have a single ROM part that is logically separated into two halves, wherein each half is separately selectable to occupy the memory address space being used.

Referring back to FIG. 1, the flash memory 10 further comprises a switching mechanism 30 configured to selectively activate the primary flash bank 12 or the secondary flash bank 14. In one embodiment, the switching mechanism 30 may include a jumper switch that can be set to activate either the primary flash bank 12 or the secondary flash bank 14. The default is to have the switching mechanism set to select the primary flash bank 12. A management controller can manually or programmatically set the jumper switch to activate the secondary flash bank 14 and bypass the primary flash bank 12.

As mentioned above, the switching mechanism 30 is initially set to activate the primary flash bank 12 when the computer system powers on, however, the switching mechanism 30 can selectively activate the secondary flash bank 14 in response to the computer system being powered on. In the scenario where the primary flash bank 12 is activated at powered on, the CRTM logic 18 gets control of the system, does some initialization, makes a series of measurements and stores the measurements in a TPM. The CRTM logic 18 then passes control to the BIOS logic 20, which performs a POST and other booting operations before passing control to the OS. If the BIOS logic 20 fails to execute to completion, then the switching mechanism 30 activates the secondary flash bank 14 upon a central processing unit (CPU) reset. The backup copy of the CRTM logic 26 then gets control of the system and proceeds to make another series of measurements because the original measurements taken by the CRTM logic 18 have been cleared upon the CPU reset. The backup copy of the CRTM logic 26 then stores the new measurements in the TPM. The backup copy of the CRTM logic 26 then passes control to the backup copy of the BIOS logic 28, which performs a POST and other booting operations before passing control to the OS. The OS will then verify the trustworthiness of the system by comparing the measurements taken by the backup copy of the CRTM logic 26 with previous measurements stored in the TPM. Below are additional details of the processing operations associated with the components shown in FIG. 1.

Regardless of which bank in the flash memory 10 is activated and executed, each copy of the CRTM logic is kept locked until reset in order to remain immutable. For instance, if the primary flash bank 12 is activated, then the CRTM logic 18 will lock itself and the backup copy of the CRTM logic 26 in the secondary flash bank 14 before turning control over to the BIOS logic 20. Conversely, if the primary flash bank is unable to complete execution, then the secondary flash bank 14 is activated and the backup copy of the CRTM logic 26 will lock itself and the CRTM logic 18 in the primary bank 12 upon completing its execution before turning control over to the backup copy of the BIOS 28.

Figure 2:
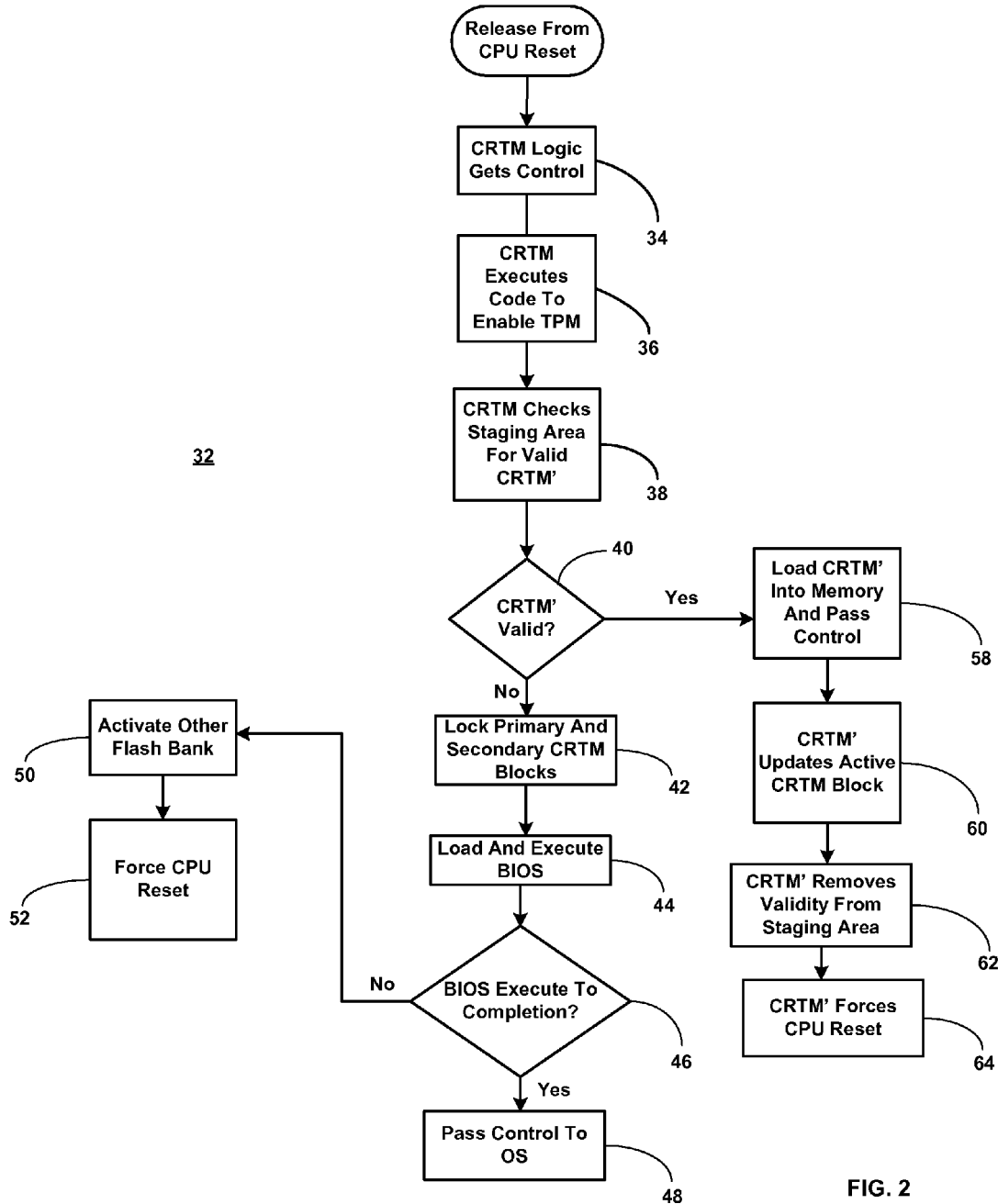
FIG. 2 is a flowchart describing some of the processing functions associated with the flash memory shown in FIG. 1.

FIG. 2 is a flowchart 32 describing some of the processing functions associated with the flash memory 10 shown in FIG. 1. The processing functions associated with the flash memory 10 begin when the processing unit within the computer system such as a CPU is released from reset. At 34, depending on the setting of the switching mechanism, the CRTM logic within the primary flash bank or the backup copy of the CRTM logic within the secondary flash bank gets control of the system and does some initialization. The CRTM logic then executes code to enable the TPM at 36. After enabling the TPM, the CRTM logic then provides the TPM with a series of measurements that it obtained. The CRTM also checks the block within the primary flash bank for staging a CRTM update at 38 to determine if there is valid a CRTM' image within the staging block. Validity is determined by using public/private key encryption. In one embodiment, the CRTM logic within the primary flash bank has the public key and the CRTM' image will have been signed with the private key. With the public key, the CRTM logic can recognize whether the CRTM' image is present in the staging area and has been signed by the private key.

If the CRTM logic determines at 40 that the CRTM' image is not a valid replacement, then the CRTM logic locks itself and locks the other non-activated copy of the CRTM logic at 42. After locking the CRTM logic blocks within the primary and secondary flash banks, control is passed to the BIOS logic within the activated flash bank. The BIOS logic loads and executes at 44. If the BIOS executes to completion as determined at 46, then control is passed to the OS at 48. Alternatively, if the BIOS does not execute to completion as determined at 46, then the CPU is held in reset and the switching mechanism activates the other flash bank at 50. The system hardware forces a CPU reset at 52 and then releases the CPU from reset which initiates the process acts described in FIG. 2.

Referring back to decision block 40 within FIG. 2, if the CRTM logic determines that the CRTM' image is a valid replacement, then the block for the CRTM logic is left unlocked to do a flash update of the CRTM' image. In particular, the CRTM' logic loads into memory at 58 and the CRTM passes control to it. The CRTM' logic then updates the active CRTM block within the primary flash bank of its logic at 60. In addition, the CRTM' logic removes the validity or the private key from the staging area within the primary flash bank at 62. The CRTM' logic then forces a CPU reset at 64 and then releases the CPU from reset, which will reiterate through the above-mentioned processing functions.

By using the above processing functions, the integrity of the CRTM logic is maintained and any update of the CRTM logic as defined by the platform manufacturer will occur in a highly controllable and protected manner. In particular, with the approach described herein, updating the CRTM logic does not occur by directly using the OS because it is necessary to keep the block containing the CRTM logic locked after exiting the logic for purposes of security and integrity. As mentioned above, the block containing the CRTM logic is locked until a reset occurs. Therefore, the OS cannot be used to update the CRTM logic because to unlock the CRTM logic block there has to be a reset, which will occur when the OS does not have control. Since the CRTM logic block will never be unlocked when OS has control, the OS cannot be used to update the CRTM logic.

The use of the staging block 22 within the primary flash bank 12 to stage the CRTM' image and the flash utility described in FIG. 2 solves the dilemma that is present with using the OS to update the CRTM logic. This approach in updating the CRTM logic is simpler and more secure because it is not being run under the OS, which is vulnerable to hackers, spyware, malware, etc. Note that this approach still allows users to update the BIOS through OS, because the OS can temporarily unlock the block containing the BIOS logic and flash the update.

The foregoing flow chart of FIG. 2 shows some of the processing functions associated with the flash memory 10 shown in FIG. 1. In this regard, each block in the flow chart represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe these processing acts may be added.

Figure 3:
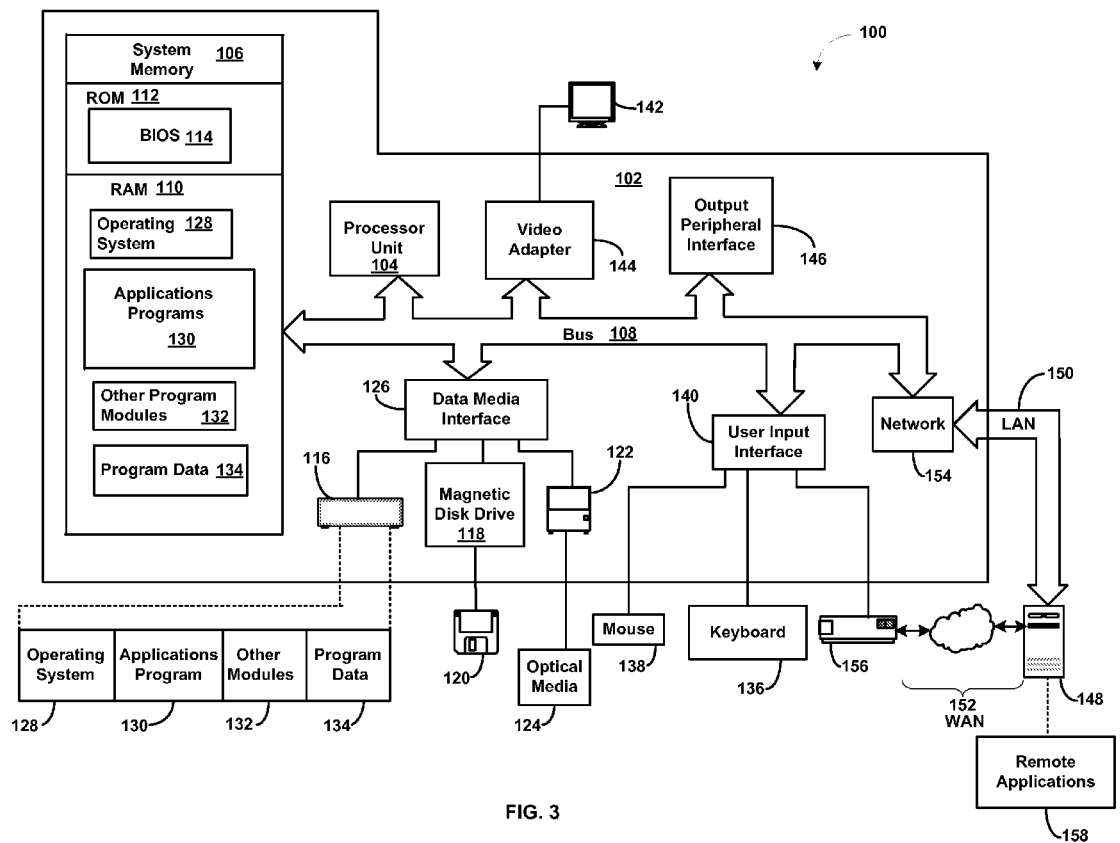
FIG. 3 shows a schematic of an exemplary computing environment in which the flash memory shown in FIG. 1 may operate.

FIG. 3 shows a schematic of an exemplary computing environment 100 in which the flash memory shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 3.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that perform particular tasks or implement particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 3, the computer 102 in the computing environment 100 is shown in the form of a general-purpose computing device. The components of computer 102 may include, but are not limited to, one or more processors or processor units 104, a system memory 106, and a bus 108 that couples various system components including the system memory 106 to the processor unit 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media also referred to as computer readable medium. Such media may be any available media that is accessible by computer 102, and it includes both volatile and non-volatile media, removable and non-removable media.

In FIG. 3, the system memory 106 includes computer readable media (computer readable medium) in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112 in the form of the flash memory 10 depicted in FIG. 1. Other elements depicted in the flash memory 10 would also be in the ROM 112. RAM 110 typically contains data and/or program modules that are immediately accessible to and/or presently operated on by processor 104.

Computer 102 may further include other removable/non-removable, volatile/non-volatile computer storage media also referred to as computer readable medium. By way of example only, FIG. 3 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media (computer readable medium) provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an OS 128, one or more application programs 130, other program modules 132, and program data 134.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 3 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 3 illustrates remote application programs 158 as residing on a memory device of remote computer 148. It will be appreciated that the network connections shown and described are exemplary and other means of establishing a communications link between the computers may be used.

Other devices may be used in computer 102. For instance, there may be a TPM (not shown), configured to receive measurements from the CRTM logic used in the flash memory 10 which resides in the ROM 112. In one embodiment, the CRTM logic would transfer measurements to the TPM via the bus 108 in response to a command generated from the processor unit 104.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

An implementation of an exemplary flash memory 10 can take the form of an entirely hardware embodiment, an entirely software embodiment or an embodiment containing both hardware and software elements. In a preferred embodiment, the invention is implemented in software, which includes but is not limited to firmware, resident software, microcode, etc.

In one embodiment, the flash memory 10 as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It is apparent that there has been provided with this disclosure, an approach for providing CRTM for systems using a backup copy of BIOS. While the disclosure has been particularly shown and described in conjunction with a preferred embodiment thereof, it will be appreciated that variations and modifications can be effected by a person of ordinary skill in the art without departing from the scope of the disclosure.

What is claimed is:

1. A computer system, comprising:
a flash memory including a primary flash bank and a secondary flash bank, wherein the primary flash bank comprises Core Root of Trust Measurement (CRTM) logic and Basic Input/Output System (BIOS) logic and the secondary flash bank comprises a backup copy of the CRTM logic and the BIOS logic; and
a switching mechanism configured to selectively activate the primary flash bank or the secondary flash bank.

2. The system according to claim 1, wherein the CRTM logic in the primary flash bank and the backup copy of the CRTM logic in the secondary flash bank have lock until reset capability.

3. The system according to claim 2, wherein the CRTM logic in the primary flash bank is configured to lock itself and the backup copy of the CRTM logic in the secondary flash bank before turning control over to another software component and wherein the backup copy of the CRTM logic in the secondary flash back is configured to lock itself and the CRTM logic in the primary flash bank before turning control over to another software component.

4. The system according to claim 1, wherein the BIOS logic in the primary flash bank and the backup copy of the BIOS logic in the secondary flash bank have temporary lock capability.

5. The system according to claim 1, wherein the primary flash bank comprises a CRTM staging area configured to stage a CRTM update with replacement CRTM logic.

6. The system according to claim 5, wherein the CRTM staging area has temporary lock capability.

7. An integrated circuit on a semiconductor on insulator chip comprising the system of claim 1.

8. A method for providing Core Root of Trust Measurement (CRTM) within a computer system having a backup copy of Basic Input/Output System (BIOS) logic, comprising:
receiving an indication that the computer system is being powered on;
selectively activating either a primary flash bank having CRTM logic and BIOS logic stored therein or a secondary flash bank having a backup copy of the CRTM logic and BIOS logic stored therein;
passing control of the computer system to the CRTM logic and then the BIOS logic of the selectively activated flash bank;
activating the non-selected flash bank in response to the BIOS logic within the selected flash bank failing to execute to completion; and
passing control of the computer system to the CRTM logic and then the BIOS logic in the newly activated flash bank.

9. The method according to claim 8, further comprising locking the CRTM logic stored within the primary flash bank and the backup copy of the CRTM logic stored within the secondary flash bank upon completion of executing the CRTM logic.

10. The method according to claim 8, further comprising staging a CRTM update of the CRTM logic within the primary flash bank.

11. The method according to claim 10, wherein the staging of a CRTM update comprises:
determining whether a staging area within the primary flash bank contains a valid replacement of CRTM logic; and
loading the replacement CRTM logic into memory and passing control of the computer system to the replacement CRTM logic in response to a determination of valid replacement CRTM logic.

12. The method according to claim 11, wherein the determining of a valid replacement of CRTM logic comprises using a public key that is contained within the CRTM logic and validating that the replacement CRTM logic was signed with a private key that associates with the public key.

13. The method according to claim 11, further comprising updating a segment of the primary flash bank that stores the CRTM logic with the valid replacement CRTM logic.

14. A computer-readable medium storing computer instructions for providing Core Root of Trust Measurement (CRTM) within a computer system having a backup copy of Basic Input/Output System (BIOS) logic, the computer instructions when executed by the computer system carry out the following steps:
receiving an indication that the computer system is being powered on;
selectively activating either a primary flash bank having CRTM logic and BIOS logic stored therein or a secondary flash bank having a backup copy of the CRTM logic and BIOS logic stored therein;
passing control of the computer system to the CRTM logic and then the BIOS logic of the selectively activated flash bank;
activating the non-selected flash bank in response to the BIOS logic within the selected flash bank failing to execute to completion; and
passing control of the computer system to the CRTM logic and then the BIOS logic in the newly activated flash bank.

15. The computer-readable medium according to claim 14, further storing instructions for locking the CRTM logic stored within the primary flash bank and the backup copy of the CRTM logic stored within the secondary flash bank upon completion of executing the CRTM logic.

16. The computer-readable medium according to claim 14, further storing instructions for staging a CRTM update of the CRTM logic within the primary flash bank.

17. The computer-readable medium according to claim 16, wherein the staging of a CRTM update comprises:
determining whether a staging area within the primary flash bank contains a valid replacement of CRTM logic; and
loading the replacement CRTM logic into memory and passing control of the computer system to the replacement CRTM logic in response to a determination that the replacement CRTM logic is valid.

18. The computer-readable medium according to claim 17, wherein the determining of a valid replacement of CRTM logic comprises using a public key that is contained within the CRTM logic and validating that the replacement CRTM logic was signed with a private key that associates with the public key.

19. The computer-readable medium according to claim 17, further storing instructions for locking the CRTM logic in the primary flash bank and the backup copy of the CRTM logic within the secondary flash bank if the replacement CRTM logic is invalid.

20. The computer-readable medium according to claim 17, further storing instructions for updating a segment of the primary flash bank that stores the CRTM logic with the valid replacement CRTM logic.

* * * * *